No. 747,913. PATENTED DEC. 22, 1903.
N. HARRISON & J. WHARTON.
PROCESS OF MAKING SHEET GLASS.
APPLICATION FILED SEPT. 12, 1902.
NO MODEL. 2 SHEETS—SHEET 1.
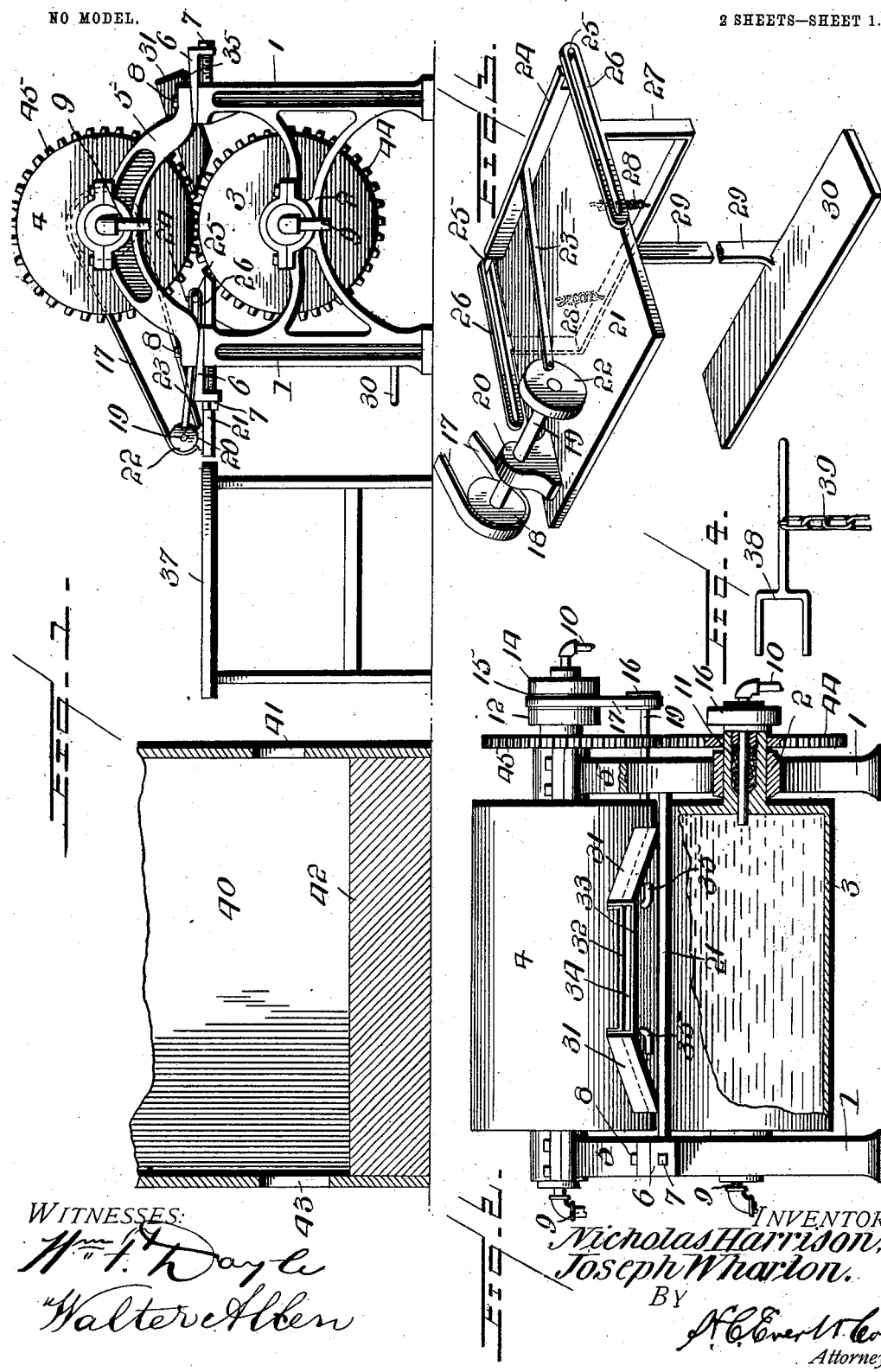
WITNESSES:
INVENTORS
Nicholas Harrison,
Joseph Wharton.
BY
Attorneys

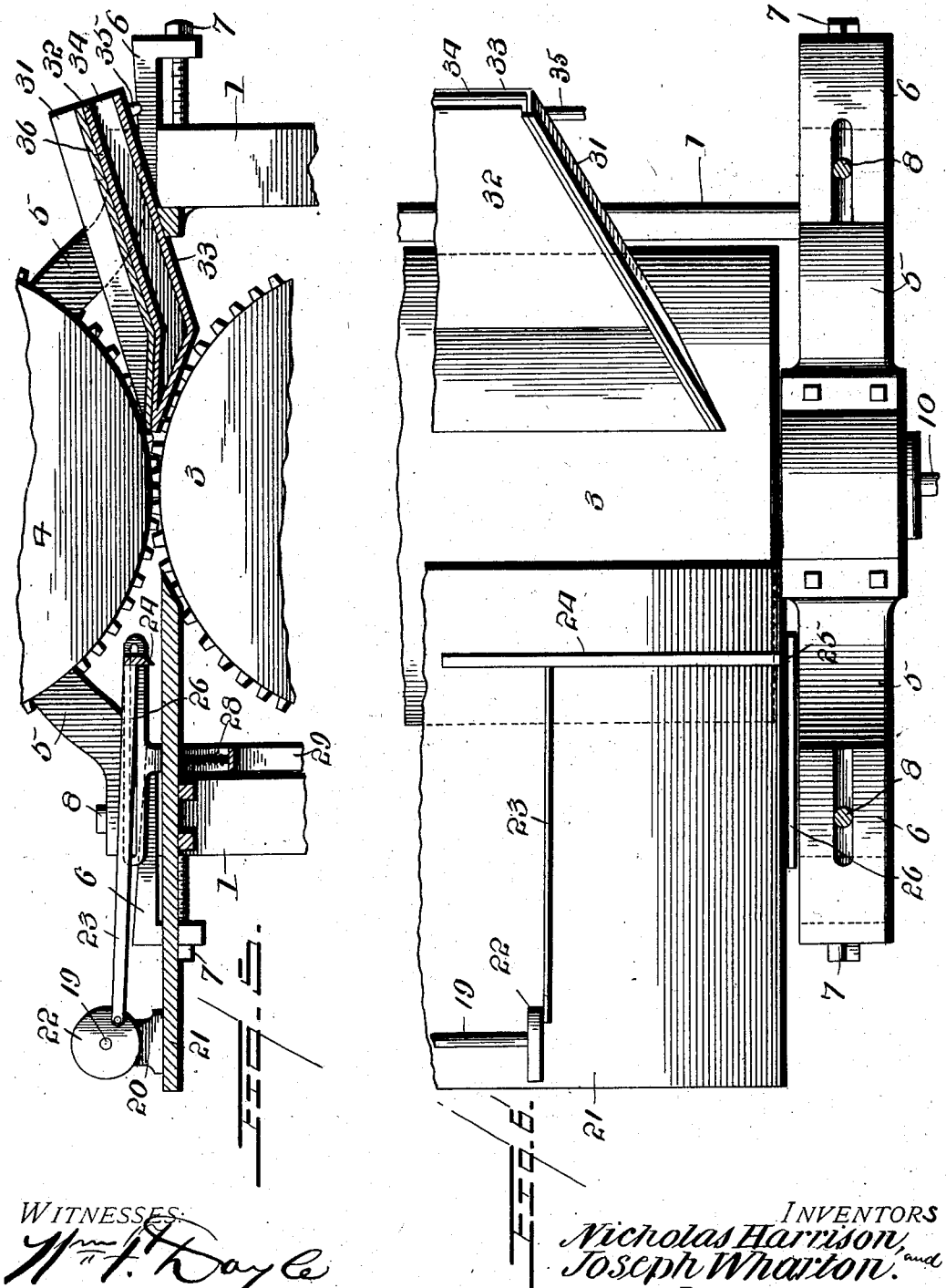

No. 747,913. Patented December 22, 1903.

UNITED STATES PATENT OFFICE.

NICHOLAS HARRISON AND JOSEPH WHARTON, OF MONONGAHELA, PENNSYLVANIA, ASSIGNORS OF ONE-THIRD TO SAMUEL R. WIGHTMAN, OF MONONGAHELA, PENNSYLVANIA.

PROCESS OF MAKING SHEET-GLASS.

SPECIFICATION forming part of Letters Patent No. 747,913, dated December 22, 1903.

Application filed September 12, 1902. Serial No. 123,062. (No specimens.)

*To all whom it may concern:*

Be it known that we, NICHOLAS HARRISON and JOSEPH WHARTON, citizens of the United States of America, residing at Monongahela, in the county of Washington and State of Pennsylvania, have invented certain new and useful Improvements in Processes of Making Sheet-Glass, of which the following is a specification, reference being had therein to the accompanying drawings.

Our invention relates to certain new and useful improvements in the process for making sheet-glass; and the primary object of the invention is to make window-glass by rolling instead of blowing the same in the form of a cylinder, then shearing the cylinder so as to split the same from end to end, and then flattening the same into a flat sheet, as in the ordinary process.

Our invention contemplates the passing of the molten glass direct from a tank to a trough or pan, on which it is permitted to spread, and so placed as to feed the same horizontally between a pair of water-cooled rolls, these rolls forming the glass into a flat sheet, which is conducted on to a horizontal table, where a reciprocating knife automatically cuts the same into plates or sheets of glass of the desired size, and from which table the plates or sheets of glass are removed and placed in horizontal position for flattening in an oven to be polished for restoring transparency to the glass.

An apparatus for carrying out our invention is illustrated in the accompanying drawings, in which—

Figure 1 is a side elevation of the complete apparatus, showing the oven in section. Fig. 2 is an end elevation partly in section. Fig. 3 is a detail perspective view of the table and the knife for cutting the glass into the desired-sized sheets. Fig. 4 is a detail plan view of the fork employed for removing the sheets or plates from the table to place the same in the finishing-oven. Fig. 5 is a detail vertical longitudinal section. Fig. 6 is a plan view.

Our apparatus comprises a pair of housings 1, each of which carry bearing-brackets 2, in which the lower roll 3 is suitably journaled. The upper roll 4 is journaled in a bearing-bracket 5, which is mounted upon the housings 1, and in order to increase or decrease the size of the pass between the two rolls we mount bearing-brackets 5 upon wedges 6, which are carried on screws 7, engaging into the housings 1. These wedges 6 in practice are slotted, so that they may be forced inwardly or outwardly by the loosening of the securing-bolt 8 and the turning of the screw 7, the bolt 8 riding in the slot of the wedge. The rolls 3 and 4 are hollow, and extending through the hollow journal of each roll, at one end thereof, is a water-supply pipe 9, and extending through the opposite hollow journal of each roll is the water-outlet pipe 10, thus keeping up the circulation of the water in the rolls in order to keep the same comparatively cool at all times. A suitable stuffing-box 11 is preferably arranged in each of the hollow journals of the rolls. The hollow journal at one end of the rolls is extended, and on that of the upper roll are mounted three pulleys 12, 14, and 15, and on the extended hollow journal of the lower roll is mounted a pulley 16. The pulley 12 of the upper roll alines with the pulley 16 and receives the belt, whereby the two rolls are revolved in unison. The pulley 14 receives the drive-belt, (not shown,) while the pulley 15 receives the belt 17, which passes over the pulley 18, carried by the shaft 19, mounted in the bearing 20 upon the table 21. The other end of this shaft carries a disk 22, to which is eccentrically connected one end of the pitman 23, the other end of the pitman being connected to the knife 24. This knife 24 is adapted to sever the sheets into the desired size. To this end the knife is provided at its ends with studs 25, which ride in slotted links 26, carried by the U-shaped bracket 27, which is suspended from the table 21 by means of springs 28. The lever 29 is connected centrally to this U-shaped bracket 27 and has a treadle 30 at its lower end. The table 21 is supported in any suitable manner upon one of the housings and extends inwardly in close proximity to the rolls, its one end being beveled so it will lie in close proximity to the lower roll and receive the molten glass as it is passed between the rolls. A feeding trough or pan is provided at the other side of the rolls and into which the molten glass is conducted direct from the tank by any suitable connection. (Not shown.) This pan 31 has an intermediate bottom 32, which lies at an incline for the major portion of its width and then extends on a substantially horizontal line into the pass between the two rolls. Between the bottom 32 and the bottom 33 of the pan is a water-space 34, with which a suitable water-supply is connected, and the water-space is provided with overflow-outlets 35 at the water-level, the water being supplied at the mouth of the water-space. The side walls or flanges of the pan converge, as best seen in Fig. 1 of the drawings, whereby the inlet to the pan is contracted considerably in proportion to its width at the end which lies in the pass between the rolls. The glass as it falls down the pan in the pass between the rolls is designated by the numeral 36.

The manner of carrying out our process is further illustrated in Figs. 1 and 4 of the drawings, and to this end we may provide a supplemental table or stand 37, placed in front of the table 21 to receive the glass sheet or plate after it has been severed by the knife. When the glass sheet or plate is delivered onto the table or stand 37, it is engaged by the fork which is placed under the plate or sheet, a convenient form of fork being designated by numeral 38 in Fig. 4 of the drawings. This fork, as in practice, is suspended from a chain 39, connected at any suitable point. When the operator has placed the sheet or plate upon the fork 38, it is carried to the finishing-oven 40 and placed therein through the door or opening 41 onto the polishing-stand 42. The opposite side of the furnace has an opening 43, by means of which the polishing-block (not shown) may be inserted into the finishing-oven and the glass sheet or plate engaged therewith and polished during the time it is being subjected to the temperature of the oven and the transparency of the glass restored. Heretofore in the attempted rolling of glass it has been found that the glass in passing between the rolls was "blinded;" but with our improved method of passing the glass between the water-cooled rolls, the severing of the sheet while still hot, and immediately transferring the severed sheet to the finishing-oven it has been found that any transparency that the glass may have lost during the process of rolling is effectually restored.

In operation the molten glass is conducted from the tank into the feeding trough or pan, where it spreads into a sheet and flows toward the pass between the rolls and is rolled out in a sheet or plate and delivered on the table 21. When the sheet or plate of the desired size has been delivered to the table 21, the operator places a foot on the treadle 30, thus causing the knife to descend into engagement with the plate or sheet, which is still hot, and cuts the sheet, which cools the severed edges sufficiently to prevent their reuniting, and when the operator releases the pressure of the treadle the springs 28 return the knife to its elevated position, and the same is again moved backward and forward, due to the rotation of shaft 19 and disk and pitman-wheel 22, when the treadle is again operated to sever another sheet. By employing a reciprocating knife the sheet can be cut into different lengths at different parts of the table.

We preferably drive the two rolls 3 and 4 in unison by means of the cog-wheels or gears 44 45, as seen in Fig. 1, and the pulleys 12 16, together with the belt, may when the cog-wheels or gears are employed be dispensed with.

Having fully described our invention, what we claim as new, and desire to secure by Letters Patent, is—

The process of making sheet-glass which consists in preliminarily spreading by its own weight and simultaneously cooling a mass of glass, then simultaneously cooling, rolling the glass to final sheet form, and carrying it forward horizontally in approximately a straight line without bending, then severing into sections by a substantially rectilinear cut normal to the sheet and finally polishing the sections at a high temperature to restore the surface transparency.

In testimony whereof we affix our signatures in the presence of two witnesses.

NICHOLAS HARRISON.
JOSEPH WHARTON.

Witnesses:
 GEO. T. LINN,
 DAVID A. DUCHARME.